US011728512B2

United States Patent
Cao et al.

(10) Patent No.: US 11,728,512 B2
(45) Date of Patent: Aug. 15, 2023

(54) WIDE-RANGE TEMPERATURE ELECTROLYTE, PREPARATION THEREOF AND LITHIUM ION BATTERY

(71) Applicants: Huazhong University of Science and Technology, Hubei (CN); STATE GRID XINJIANG ELECTRIC POWER CO., LTD. ELECTRIC POWER RESEARCH INSTITUTE, Xinjiang (CN)

(72) Inventors: Yuancheng Cao, Hubei (CN); Weixin Zhang, Hubei (CN); Shun Tang, Hubei (CN); Jian Wang, Xinjiang (CN)

(73) Assignees: Huazhong University of Science and Technology, Wuhan (CN); STATE GRID XINJIANG ELECTRIC POWER CO., LTD. ELECTRIC POWER RESEARCH INSTITUTE, Urumqi (CN)

( * ) Notice: Subject to any disclaimer, the term of this patent is extended or adjusted under 35 U.S.C. 154(b) by 102 days.

(21) Appl. No.: 17/246,574

(22) Filed: Apr. 30, 2021

(65) Prior Publication Data

US 2021/0320330 A1    Oct. 14, 2021

(30) Foreign Application Priority Data

Apr. 26, 2021 (CN) .......................... 202110455372.3

(51) Int. Cl.
*H01M 10/0565* (2010.01)

(52) U.S. Cl.
CPC ................. *H01M 10/0565* (2013.01); *H01M 2300/0025* (2013.01); *H01M 2300/0085* (2013.01)

(58) Field of Classification Search
CPC ........ H01M 10/0525; H01M 10/0565; H01M 2300/0025; H01M 2300/0082;
(Continued)

(56) References Cited

U.S. PATENT DOCUMENTS

2005/0136247 A1* 6/2005 Sumiya ................ A61Q 17/005
428/327

FOREIGN PATENT DOCUMENTS

| CN | 110003627 A | 7/2019 |
| CN | 111892521 | * 11/2020 |
| CN | 111440289 B | 4/2021 |

* cited by examiner

Primary Examiner — Miriam Stagg
Assistant Examiner — Sarah A. Slifka

(57) ABSTRACT

Disclosed herein is a wide-range temperature electrolyte, a preparation thereof and a lithium ion battery. The wide-range temperature electrolyte includes a glycerin segment, a diisocyanate segment and a segment containing at least two terminal hydroxyl groups and one disulfide bond, and the self-healing electrolyte has a three-dimensional cross-linked network structure. The wide-range temperature electrolyte introduces a large number of repetitive disulfide bond groups and self-complementary hydrogen bond structures into molecules of an electrolyte base material having self-complementary hydrogen bond structures, so as to form the three-dimensional cross-linked network structure. An intermolecular exchange reaction of the disulfide bonds realizes a cross-scale (molecular, micro, and macro-scale) damage sensing response of the electrolyte and a rapid self-healing of the material, and further achieves a multi-level (molecule-component-device-system) self-healing repair function.

12 Claims, 12 Drawing Sheets

(58) Field of Classification Search
CPC ....... H01M 2300/0085; H01M 50/403; H01M 50/414; H01M 50/44; H01M 50/494
See application file for complete search history.

WIDE-RANGE TEMPERATURE ELECTROLYTE, PREPARATION THEREOF AND LITHIUM ION BATTERY

CROSS-REFERENCE TO RELATED APPLICATIONS

This application claims the benefit of priority from Chinese Patent Application No. 202110455372.3, filed on Apr. 26, 2021. The content of the aforementioned application, including any intervening amendments thereto, is incorporated herein by reference in its entirety.

TECHNICAL FIELD

This application relates to electrolyte materials, and more particularly to a wide-range temperature electrolyte, a preparation thereof and a lithium ion battery.

BACKGROUND

The electrolyte is key part of a lithium-ion battery, and is arranged between the positive electrode and the negative electrode in the battery to transfer charges. The lithium-ion batteries have been widely used in daily life; however, there is a huge safe hazard during the repeated charging and discharging since the traditional electrolytes are usually organic liquids, which are flammable. A reliable all-solid-state electrolyte is expected to replace the liquid electrolyte to improve the safety performance of lithium-ion batteries. The solid electrolyte without an organic solvent can greatly improve the safety performance of lithium batteries, and attracts large attention of the researches. Electrolytes with wide temperature range have also become a research hotspot due to their light weight, high safety and good processing performance.

The solid electrolytes include gel electrolytes, semi-solid electrolytes and all-solid-state electrolytes. Currently, the gel electrolyte and the semi-solid electrolyte are commercially available. The gel electrolytes usually include gel polymer electrolytes (mainly polyethylene glycol (PEO)), polysiloxane-based solid electrolytes, polyacrylonitrile (PAN) electrolytes, polymethyl methacrylate (PMMA) electrolytes, single-ion conducting gel polymer electrolytes and ionic liquid electrolytes. The all-solid-state polymer electrolyte has low ionic conductivity, but is easy to shape and is suitable for mass production. Whereas the inorganic solid electrolyte has a chemical stability in a wide temperature range, a better mechanical strength and higher room temperature ionic conductivity, but is hard to process due to its large brittleness, which is a huge obstacle for the large-scale production. For polymer electrolyte materials, minor damage mainly affects the interface contact between the electrolyte and the electrode, sharply increasing the interface impedance and significantly decreasing the rate performance, cycle performance and capacity of the battery. The moderate damage and breakage of polymer electrolyte worsen the interface compatibility, and may lead to a micro short circuit inside the device. Even worse, water and oxygen may enter the device and reduces the service capacity.

To solve the above-mentioned problems, it is necessary to design an improved self-healing electrolyte with a wide temperature range, preparation thereof and a lithium ion battery.

SUMMARY

In order to overcome the above-mentioned shortcomings of the prior art, an objective of the present disclosure is to provide self-healing electrolyte with a wide temperature range as a solid-state electrolyte, preparation thereof and a lithium ion battery. The self-healing electrolyte with the wide temperature range introduces a large number of repetitive disulfide bond groups and self-complementary hydrogen bond structures into molecules of an electrolyte base material having self-complementary hydrogen bond structures, so as to form a three-dimensional cross-linked network structure, realizing a cross-scale (molecular, micro, and macro-scale) damage sensing response of the electrolyte and a rapid self-healing of the material, and further achieving a multi-level (molecule-component-device-system) self-healing repair function.

To achieve the above-mentioned objective, in a first aspect, the present disclosure provides a self-healing electrolyte with a wide temperature range, wherein the self-healing electrolyte comprises a glycerin segment, a diisocyanate segment and a segment containing at least two terminal hydroxyl groups and one disulfide bond; and the self-healing electrolyte has a three-dimensional cross-linked network structure.

In some embodiments, the diisocyanate segment is polyethylene glycol, polypropylene glycol or polybutylene glycol capped with an isocyanate.

In some embodiments, the diisocyanate segment is a polypropylene glycol segment whose both ends are capped with 2,4-toluene diisocyanate; and a number-average molecular weight of the diisocyanate segment is 700-3000 Da.

In some embodiments, the segment containing at least two terminal hydroxyl groups and one disulfide bond is obtained by reacting N-ethylethanolamine and carbon disulfide.

In a second aspect, the present disclosure provides a method for preparing the above-mentioned self-healing electrolyte with the wide temperature range, characterized in that the method comprises:

S1. reacting N-ethylethanolamine with carbon disulfide to obtained a product marked as TDS;

S2. reacting a diisocyanate with a polyether polyol capped with a hydroxyl group to obtain a polyether polyol capped with an isocyanate; and S3. mixing glycerin, the TDS obtained in step (S1) and the polyether polyol capped with the isocyanate obtained in step (S2) for reacting, so as to obtain the self-healing electrolyte with the wide temperature range.

In some embodiments, in step (S1), the reaction is performed in a chloroform solution containing iodine under an ice bath.

In some embodiments, in step (S2), the diisocyanate is selected from the group consisting of toluene diisocyanate (TDI), isophorone diisocyanate (IPDI), diphenylmethane diisocyanate (MDI), dicyclohexylmethane diisocyanate (HMDI), hexamethylene diisocyanate (HDI), lysine diisocyanate and a combination thereof; and the polyether polyol is selected from the group consisting of polyethylene glycol, polypropylene glycol, polybutylene glycol and a combination thereof.

In some embodiments, the step (S3) comprises:

dissolving the glycerin in an organic solvent; adding a catalyst, the polyether polyol capped with the isocyanate obtained in step (S2) and the TDS obtained in step (S1) into the organic solvent in sequence followed by reacting at 55-65° C. for 3-6 h; and removing the organic solvent to obtain the self-healing electrolyte with the wide temperature range.

In a third aspect, the present disclosure further provides a lithium ion battery, wherein an electrolyte of the lithium ion battery is any one of the above-mentioned self-healing electrolytes with the wide temperature range.

In some embodiments, the electrolyte of the lithium ion battery is prepared by making the self-healing electrolyte with the wide temperature range into a film or soaking a non-woven fabric into the self-healing electrolyte with the wide temperature range to form a composite electrolyte membrane.

The beneficial effects of the present disclosure are described as follows.

1. The present disclosure provides a self-healing electrolyte with a wide temperature range, which includes a glycerin segment, a diisocyanate segment and a segment containing at least two terminal hydroxyl groups and one disulfide bond, and the self-healing electrolyte has a three-dimensional cross-linked network structure, which contains a large number of disulfide bonds and complementary hydrogen bonds, and has a high elastic modulus and excellent electrochemical performance. With the help of the self-healing effect of the TDS disulfide bond and the hydrogen bond, the electrolyte realizes a cross-scale (molecular, micro, and macro-scale) damage sensing response and a rapid self-healing, and further achieves a multi-level (molecule-component-device-system) self-healing repair function, equipping the product with a high self-healing ability.

2. The cross-linked network structure with glycerin as a center of the self-healing electrolyte provided herein is formed by means of a polyhydroxyl structure of the glycerin. The polyether polyol capped with an isocyanate is connected to the glycerin and TDS, respectively. The polyether polyol capped with the isocyanate provides the three-dimensional cross-linked network structure with more hydrogen bonds and conductive groups, and improves the flexibility of the cross-linked network structure, such that cross-linked network structure has excellent mechanical properties, self-healing properties and electrical properties.

3. The self-healing electrolyte with the wide temperature range provided herein is made of cheap and easily available raw materials, and has a good self-healing performance. In addition, the electrolyte has good mechanical and electrical properties with high self-healing rate and recovery rate, and can be used in other types of lithium ion secondary batteries such as NCM ternary lithium ion batteries and LFP lithium ion batteries.

DETAILED DESCRIPTION OF EMBODIMENTS

Figure 1A:
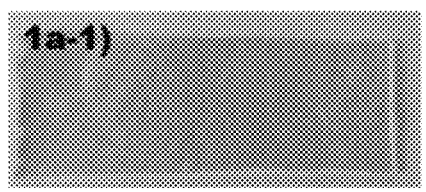
FIGS. 1A-1P show self-healing performance of a self-healing electrolyte membrane with a wide temperature range prepared in Example 1; where 1A-1H: scratched 10 times; and 1I-1P: cut 5 times.
Figure 1B:
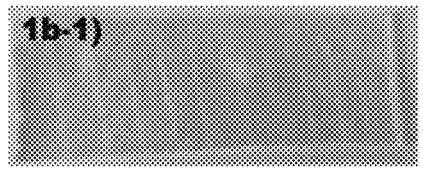
Figure 1C:
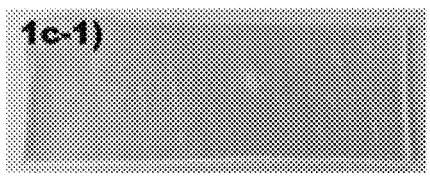
Figure 1D:
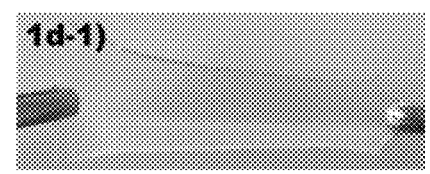
Figure 1E:
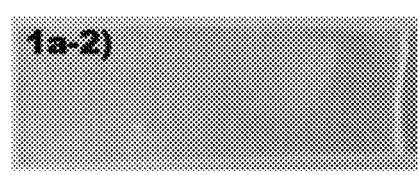
Figure 1F:
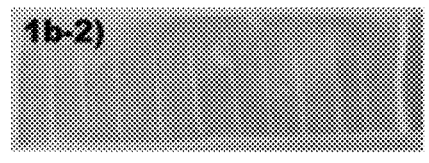
Figure 1G:
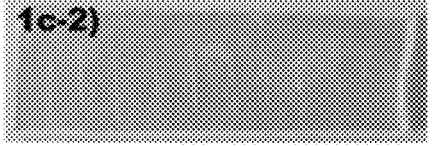
Figure 1H:
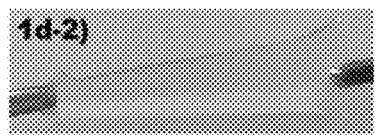
Figure 1I:
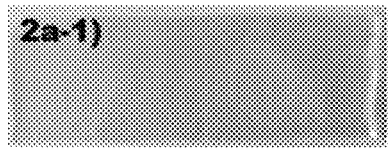
Figure 1J:
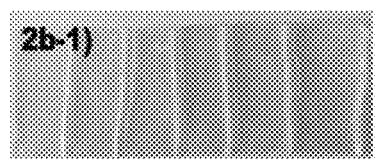
Figure 1K:
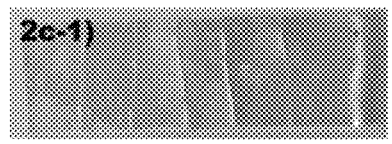
Figure 1L:
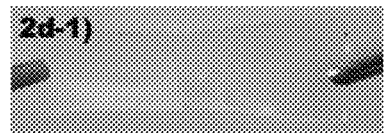
Figure 1M:
Figure 1N:
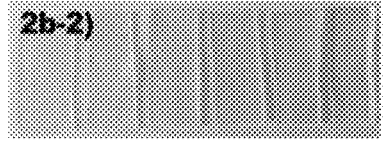
Figure 1O:
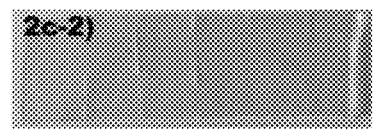

The objectives, technical solutions and beneficial effects of the present disclosure will be further described below with reference to the embodiments.

It should be noted that the embodiments provided herein omit unnecessary details, and only describe the structures and/or processing steps closely related to the technical solutions of the present disclosure, so as to avoid obscuring the disclosure with the unnecessary details.

In addition, it should also be noted that the terms "include", "comprise" or any other variation thereof are intended to cover non-exclusive inclusion, so that a process, method, article or device including a series of elements not only includes those elements, but also includes other elements that are not explicitly listed and elements inherent to the process, method, article or equipment.

The present disclosure provides a self-healing electrolyte with a wide temperature range. The self-healing electrolyte includes a glycerin segment, a diisocyanate segment and a segment containing at least two terminal hydroxyl groups and one disulfide bond, and the self-healing electrolyte has a three-dimensional cross-linked network structure, which contains a large number of disulfide bonds and complementary hydrogen bonds, and has a high elastic modulus and excellent electrochemical performance.

The diisocyanate segment is a polyether polyol capped with an isocyanate. The polyether polyol is selected from the group consisting of polyethylene glycol, polypropylene glycol, polybutylene glycol and a combination thereof. The polyether polyol capped with the isocyanate provides the three-dimensional cross-linked network structure with more hydrogen bonds and conductive groups, and improves the flexibility of the cross-linked network structure.

The diisocyanate segment is a polypropylene glycol segment whose both ends are capped with 2,4-toluene diisocyanate, and a number-average molecular weight of the diisocyanate segment is 700-3000 Da.

The segment containing at least two terminal hydroxyl groups and one disulfide bond is obtained by reacting N-ethylethanolamine and carbon disulfide.

The present disclosure further provides a method for preparing the above-mentioned self-healing electrolyte with the wide temperature range. The method includes the following steps.

S1. N-ethylethanolamine is reacted with carbon disulfide to obtain a product marked as TDS.

In step (S1), the reaction is performed in a chloroform solution containing iodine under an ice bath. A molar ratio of the N-ethylethanolamine to the carbon disulfide is 1:(0.5-1).

S2. A diisocyanate is reacted with a polyether polyol capped with a hydroxyl group to obtain a polyether polyol capped with an isocyanate.

In step (S2), the diisocyanate is selected from the group consisting of toluene diisocyanate (TDI), isophorone diisocyanate (IPDI), diphenylmethane diisocyanate (MDI), dicyclohexylmethane diisocyanate (HMDI), hexamethylene diisocyanate (HDI), lysine diisocyanate and a combination thereof; preferably, toluene diisocyanate. The polyether polyol is selected from the group consisting of polyethylene glycol, polypropylene glycol, polybutylene glycol and a combination thereof; preferably, polypropylene glycol.

S3. Glycerin, the TDS obtained in step (S1) and the polyether polyol capped with the isocyanate obtained in step (S2) are mixed for reacting, so as to obtain the self-healing electrolyte with the wide temperature range. A molar ratio of the glycerin to the TDS to the polyether polyol capped with the isocyanate is 2:(0.2-1.2):(3-8).

Specifically, the step (S3) includes the following steps.

The glycerin is dissolved in an organic solvent (preferably chloroform). A catalyst (preferably dibutyltin dilaurate), the polyether polyol capped with the isocyanate obtained in step (S2) and the TDS obtained in step (S1) are added into the organic solvent in sequence, and react at 55-65° C. for 3-6 h. Then the organic solvent is removed to obtain the self-healing electrolyte with the wide temperature range. The reaction formula is shown as follows. Three hydroxyl groups of glycerol are used as cross-linking centers to form the three-dimensional cross-linked network structure, which has an excellent self-healing property, elasticity and electrical conductivity.

self-healing electrolyte with the wide temperature range and other necessary battery materials has excellent stability, program time and economic benefits. The lithium ion secondary battery also has excellent battery performance, and significantly improves safety, self-healing effect and energy density of the battery.

The electrolyte of the lithium ion battery is prepared by making the self-healing electrolyte with the wide temperature range into a film or soaking a non-woven fabric into the self-healing electrolyte with the wide temperature range to form a composite electrolyte membrane. The self-healing electrolyte with the wide temperature range provided herein is made from cheap and available raw materials, and has excellent mechanical and electrochemical properties. In addition, the self-healing electrolyte with the wide temperature has an obvious self-healing effect and excellent electrochemical properties, and can be applied to other types of lithium ion secondary batteries such as NCM ternary lithium ion batteries and LFP lithium ion batteries.

Example 1

A preparation of a self-healing electrolyte with a wide temperature range was provided herein.

S1. 17.8 g of N-ethylethanolamine and 100 mL of chloroform were added into a flask, and stirred in an ice bath. 6 ml of carbon disulfide and 12.7 g of iodine were then added into the flask and reacted for 3 h. After removing an impurity, a product marked as TDS was obtained.

S2. 2,4-toluene diisocyanate and a polyether polyol capped with a hydroxyl group were reacted in chloroform at

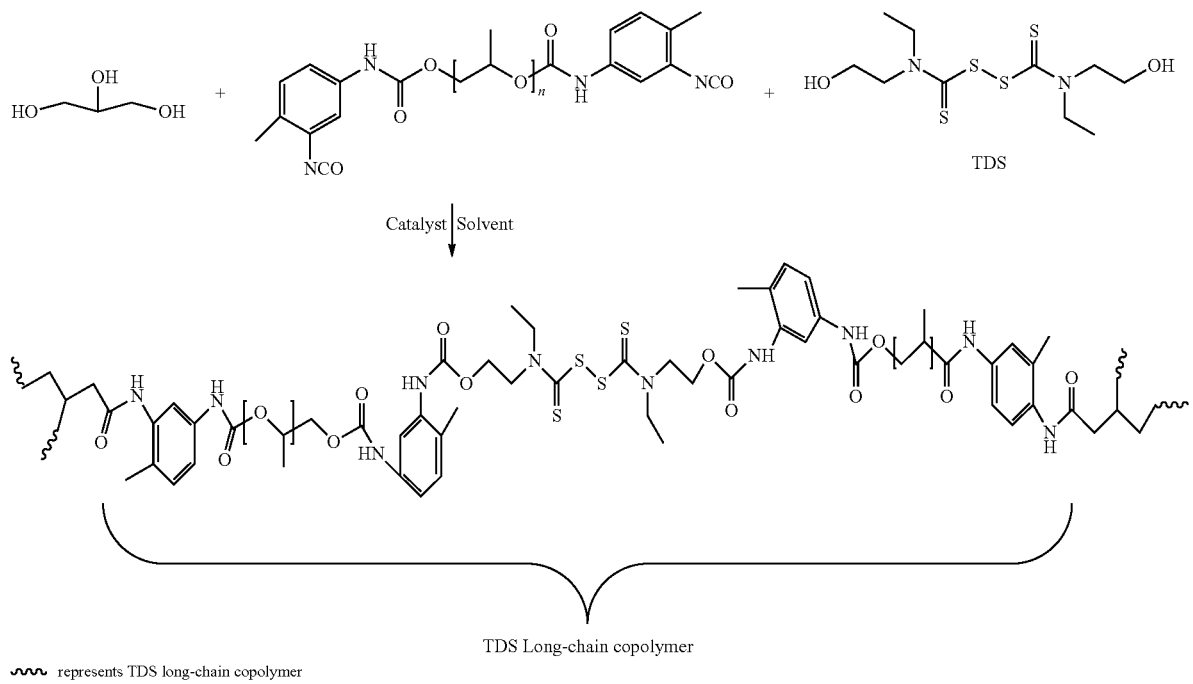

TDS Long-chain copolymer

∿∿∿ represents TDS long-chain copolymer

The present disclosure further provides a lithium ion battery, and an electrolyte of the lithium ion battery is the above-mentioned self-healing electrolyte with the wide temperature range or a self-healing electrolyte with a wide temperature range prepared by the above-mentioned method. Lithium ion secondary battery composed of the 80° C. to obtain polypropylene glycol capped with 2,4-toluene diisocyanate (molecular weight: about 2300 Da).

S3. 2 mmol of glycerol was dissolved in 50 mL of chloroform ($CHCl_3$), and then were poured into a 100 mL three-neck flask. 0.1 mmol of dibutyltin dilaurate (DBTDL), 6 mmol of the polypropylene glycol capped with 2,4-toluene diisocyanate and 1 mmol of TDS were added into the three-neck flask in sequence, and reacted at 60° C. for 5 h. The reaction solution was then poured into a polytetrafluoroethylene mold to volatilize and form a film, so as to obtain a self-healing electrolyte membrane with a wide temperature range.

Figure 1P:
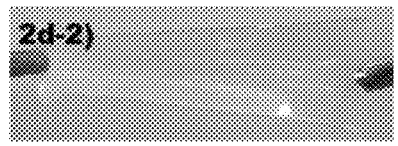

As shown in FIGS. 1A-1P (FIGS. 1A, 1E, 1I and 1M depicted the original state; FIGS. 1B, 1F, 1J and 1N depicted the state after being scratched or cut; FIGS. 1C, 1G, 1K and 1O depicted the state after self-healing for 12 h; and FIGS. 1D, 1H, 1L and 1P depicted the stretched state after self-healing for 24 h), after self-healing for 24 h, the self-healing electrolyte membrane with the wide temperature range prepared herein can be completely healed after being scratched or cut for many times, and the electrolyte still had a good tensile property after healing, indicating that the electrolyte had a good self-healing property.

Figure 2:
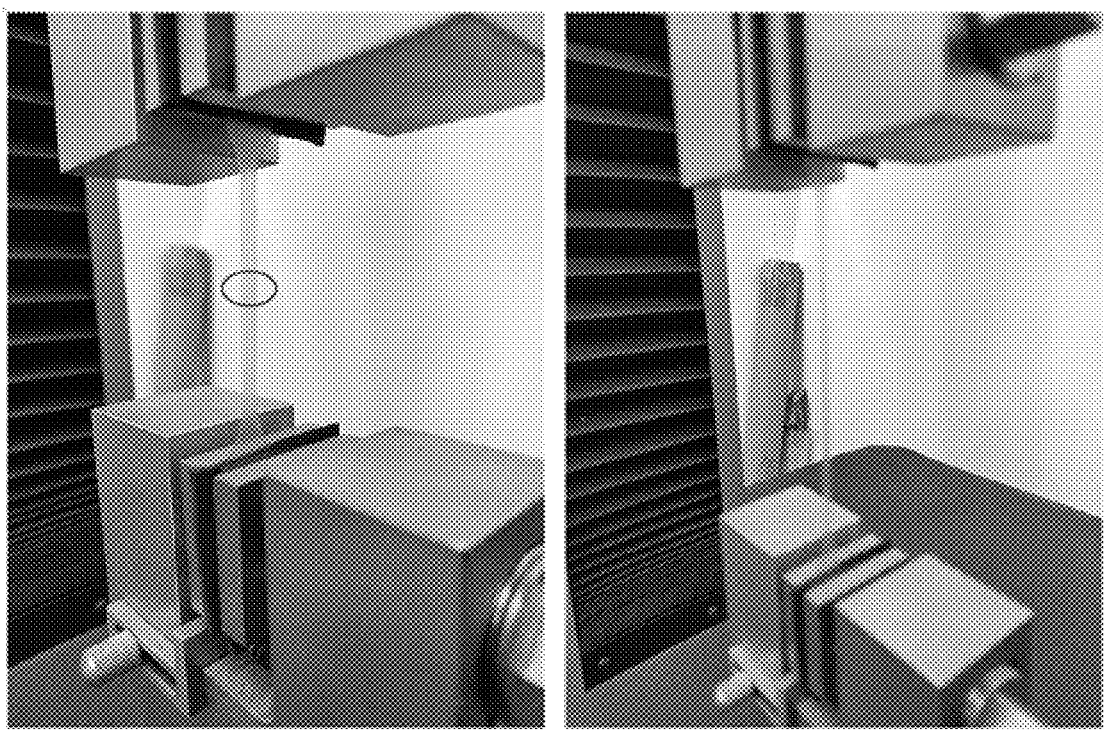
FIG. 2 shows a stretching of the self-healing electrolyte membrane prepared in Example 1.
Figure 3:
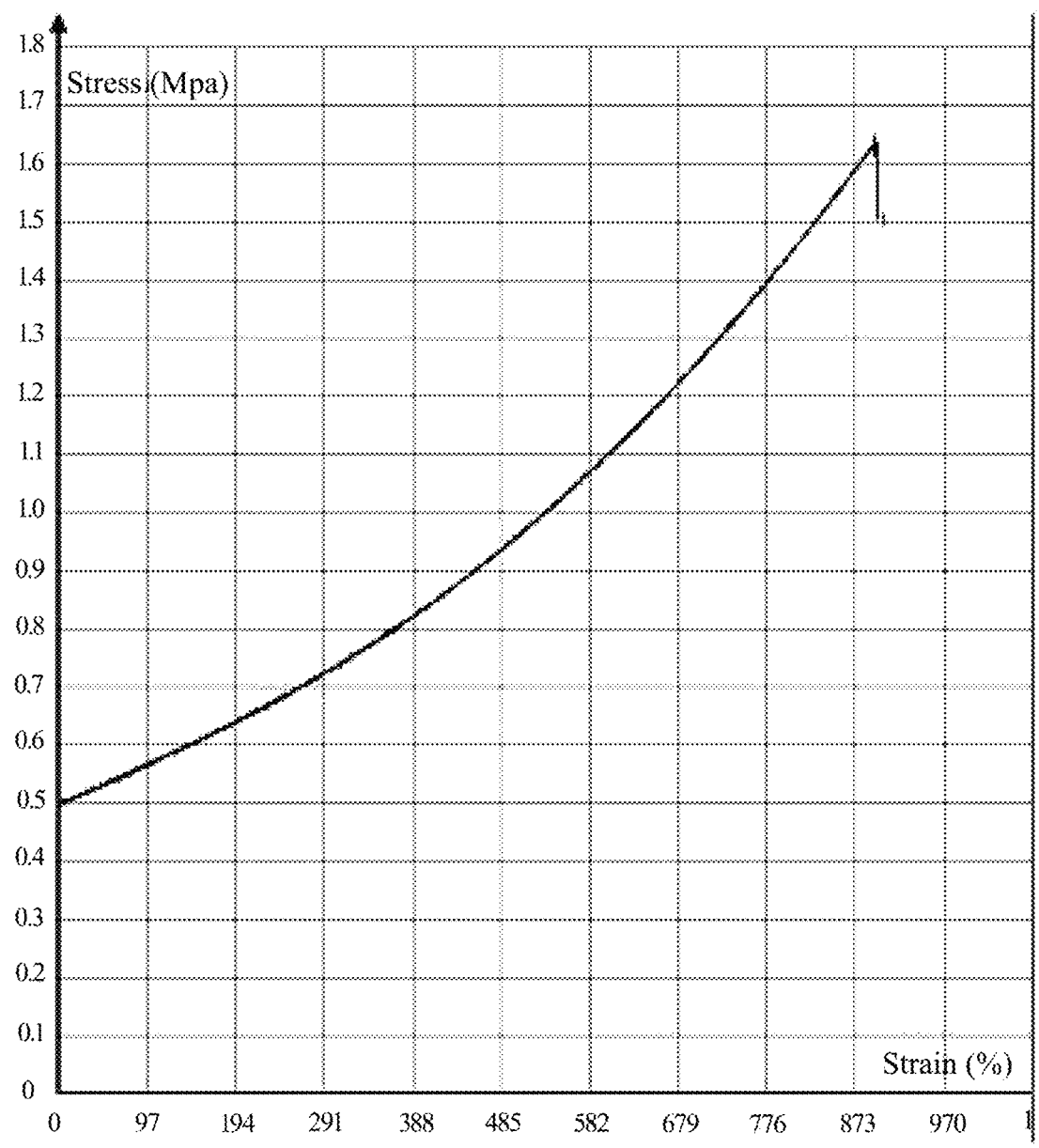
FIG. 3 is a stress-strain curve of the self-healing electrolyte membrane prepared in Example 1.
Figure 4A:
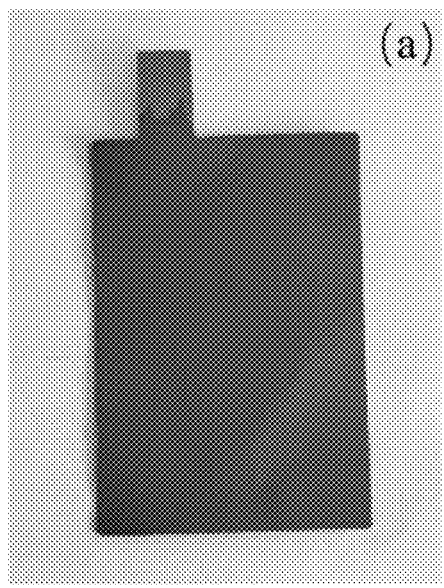
FIGS. 4A-4F show a cutting experiment of a soft-packaged battery; where 4A: negative electrode plate; 4B: a negative electrode plate+one layer of cut self-healing electrolyte (circled in the figure); 4C: a negative electrode plate+one layer of cut self-healing electrolyte+a positive electrode plate+one layer of cut self-healing electrolyte; 4D: a negative electrode plate+one layer of cut self-healing electrolyte+a positive electrode plate+one layer of cut self-healing electrolyte+a negative electrode plate; 4E: laminated product; and 4F: sealed soft-packaged battery.
Figure 4B:
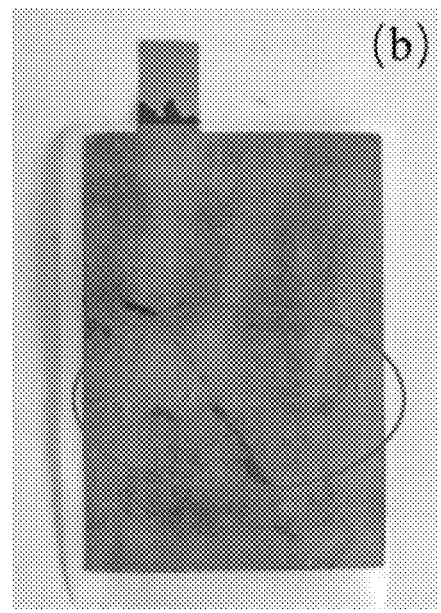
Figure 4C:
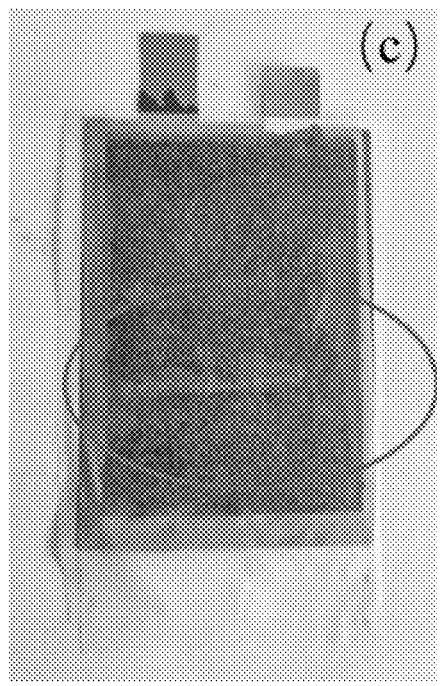
Figure 4D:
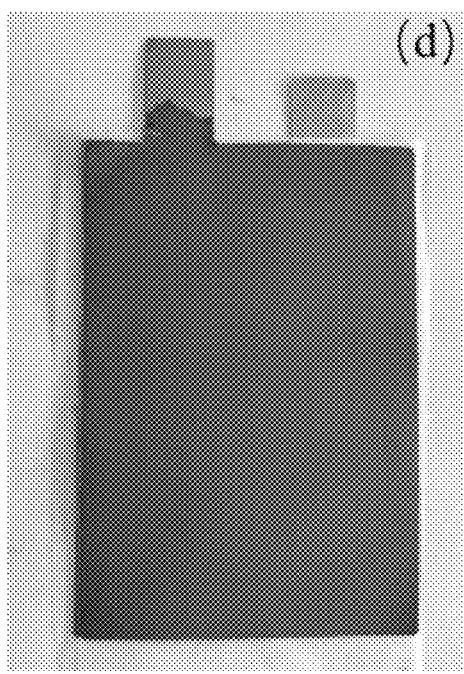
Figure 4E:
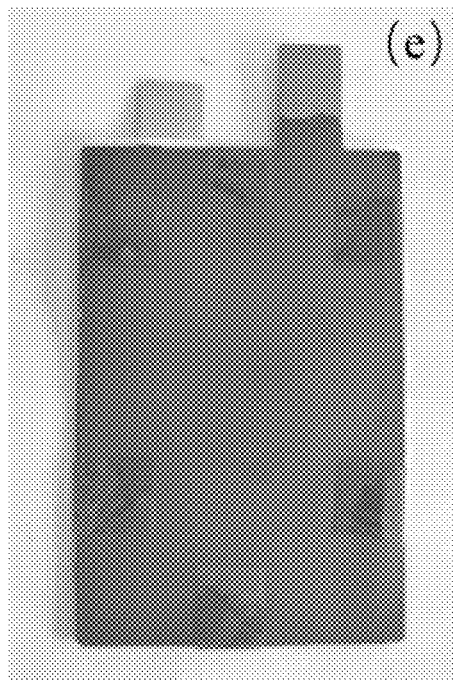
Figure 4F:

As shown in FIGS. 2 and 3, a fracture strength of the self-healing electrolyte membrane with the wide temperature range prepared herein was about 16.5 MPa, and a fracture strain was about 900%, indicating that the electrolyte had a good tensile property.

Figure 5:
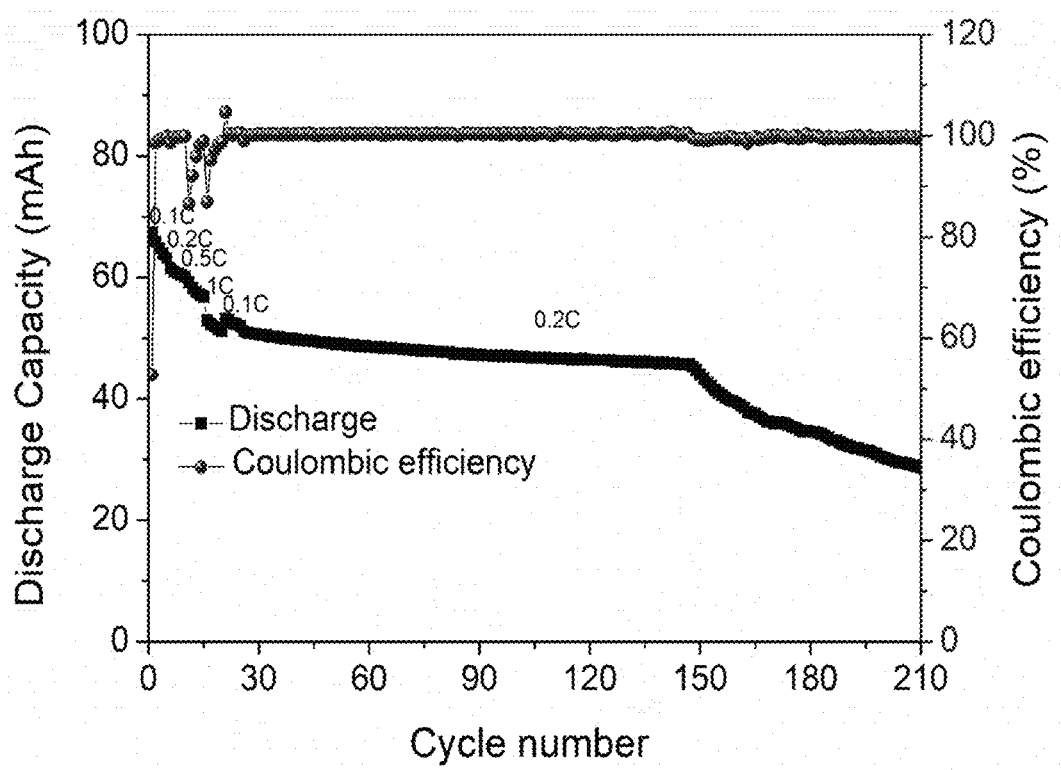
FIG. 5 shows charge-discharge curves of a 70 mAh soft-packaged battery before and after cutting.
Figure 6:
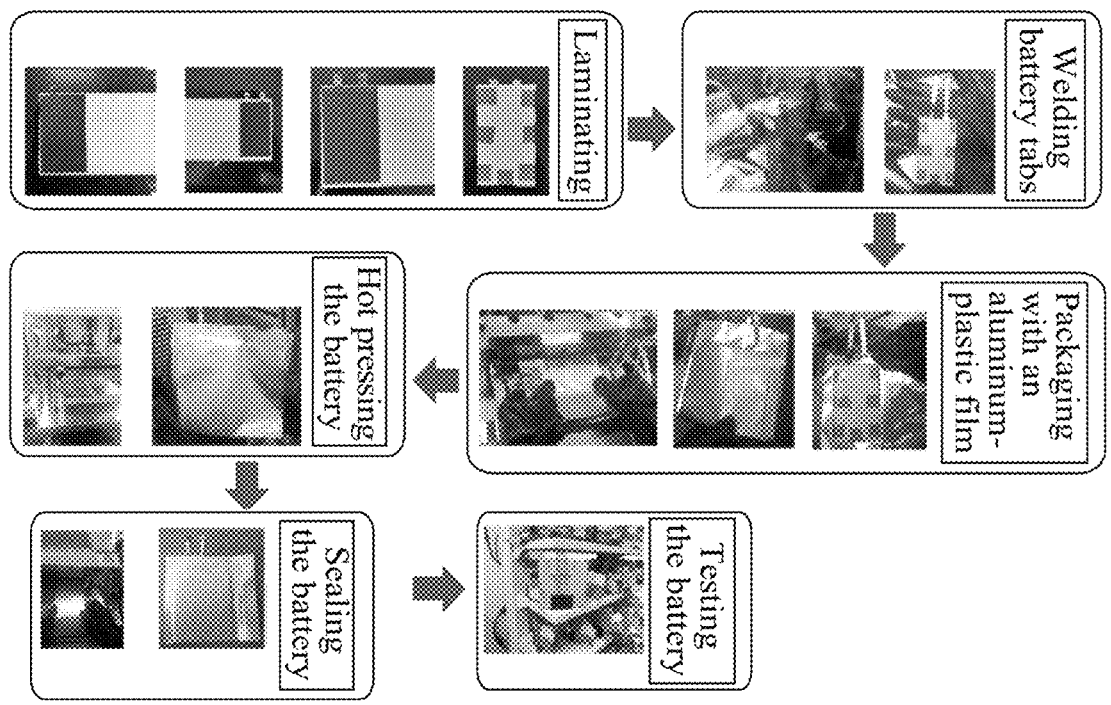
FIG. 6 schematically depicts a production of a self-healing soft-packaged battery.
Figure 7:
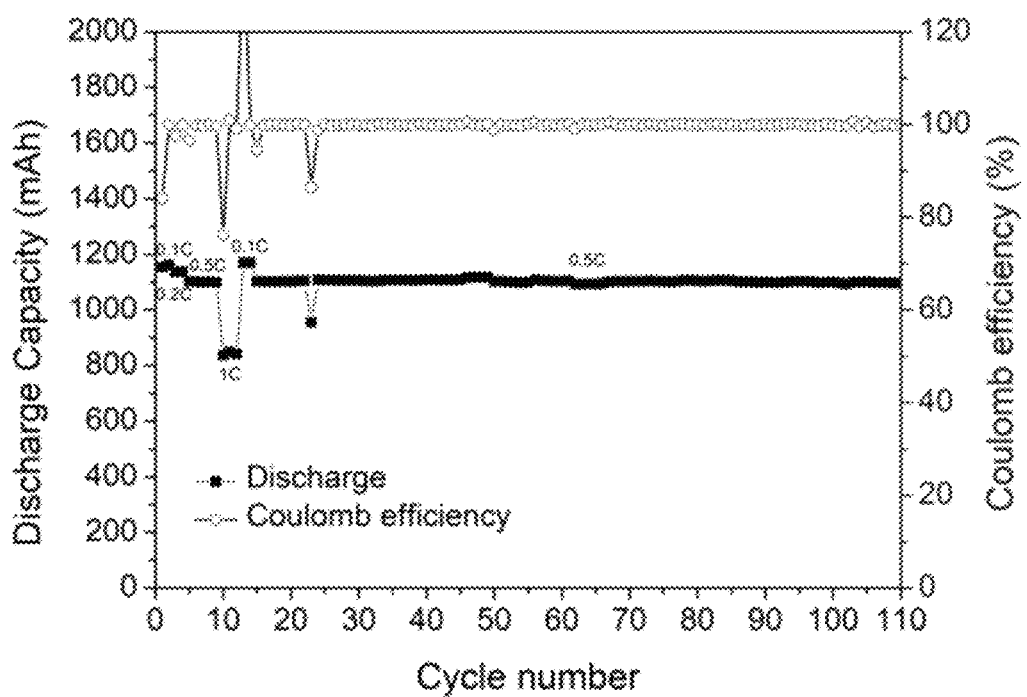
FIG. 7 shows charge-discharge curves of a 1100 mAh soft-packaged battery.

As shown in FIGS. 4A-4F and 6, the self-healing electrolyte membrane with the wide temperature range was further packaged into a 70 mAh soft-packaged battery and a 1000 mAh soft-packaged battery, respectively. The electrochemical performance of the batteries was tested. FIG. 5 showed the charge-discharge cycle of the 70 mAh soft-package battery at 0.2 C. After being cut at the 150th cycle, the battery was still charging and discharging normally, but the capacity was reduced. FIG. 7 showed the charge-discharge cycle of the 1100 mAh soft-packaged battery at 0.5 C. It was shown that the 1100 mAh soft-packaged battery had a good cycling performance.

Examples 2-3 and Comparative Example 1

The preparations of the self-healing electrolyte with the wide temperature range in Examples 2-3 and Comparative Example 1 were basically the same as that in Example 1 except the molar ratio of the glycerin, the TDS, and the polypropylene glycol capped with 2,4-toluene diisocyanate. Those molar ratios were shown in Table 1.

TABLE 1

Preparation conditions and performance test results in Examples 1-3 and Comparative Example 1

| Example | Molar ratio | Fracture strength (MPa) | Fracture strain (%) | Elastic recovery rate (%) | Battery capacity (mAh) |
|---|---|---|---|---|---|
| 1 | 2:1:6 | 16.5 | 900 | 70 | 69 |
| 2 | 2:0.2:6 | 14.3 | 500 | 50 | 71 |
| 3 | 2:1:3 | 18.4 | 1100 | 100 | 66 |
| Comparative Example 1 | 1:1:6 | 15.8 | 1000 | 90 | 67 |

The thickness of the test specimens for fracture strength in Table 1 was 0.44 mm.

As shown in Table 1, with the addition of the TDS, the fracture strength of the electrolyte was increased, but the elastic recovery rate and the battery capacity were decreased.

Figure 8:
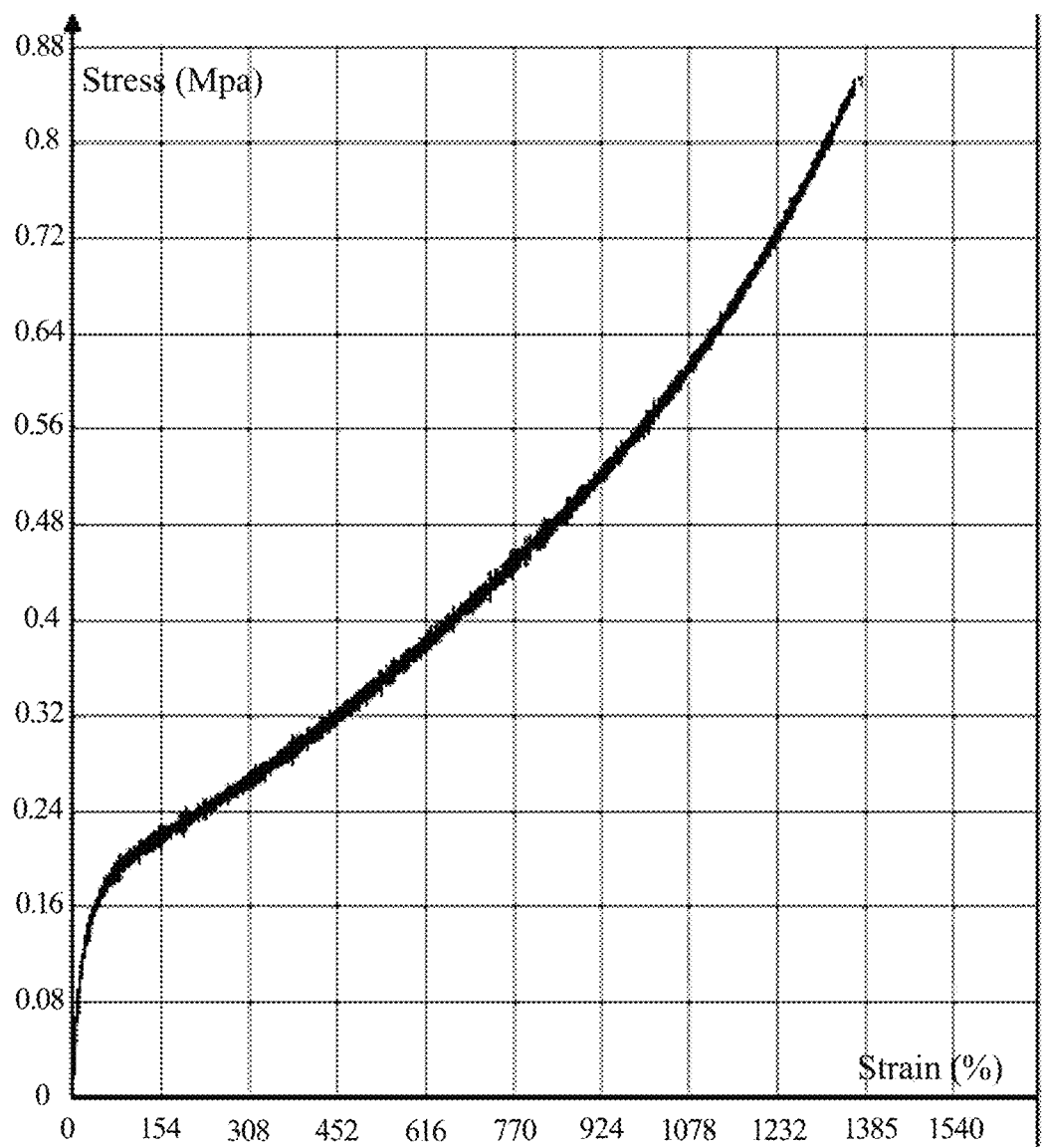
FIG. 8 is a stress-strain curve of the self-healing electrolyte membrane with the wide temperature range prepared in Example 3.
Figure 9:
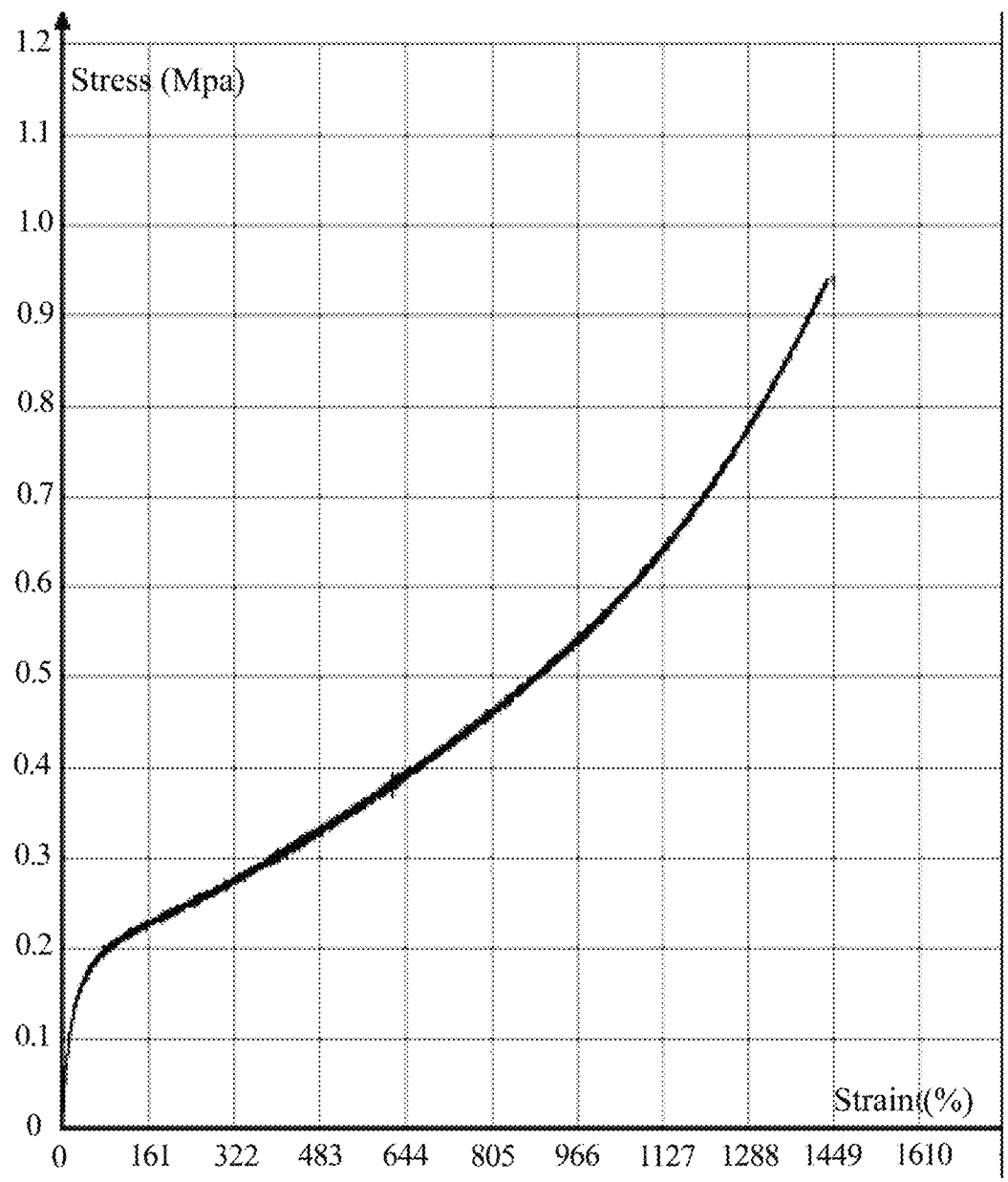
FIG. 9 is a stress-strain curve of the self-healing electrolyte membrane with the wide temperature range prepared in Example 3 after scratching and self-healing.
Figure 10:
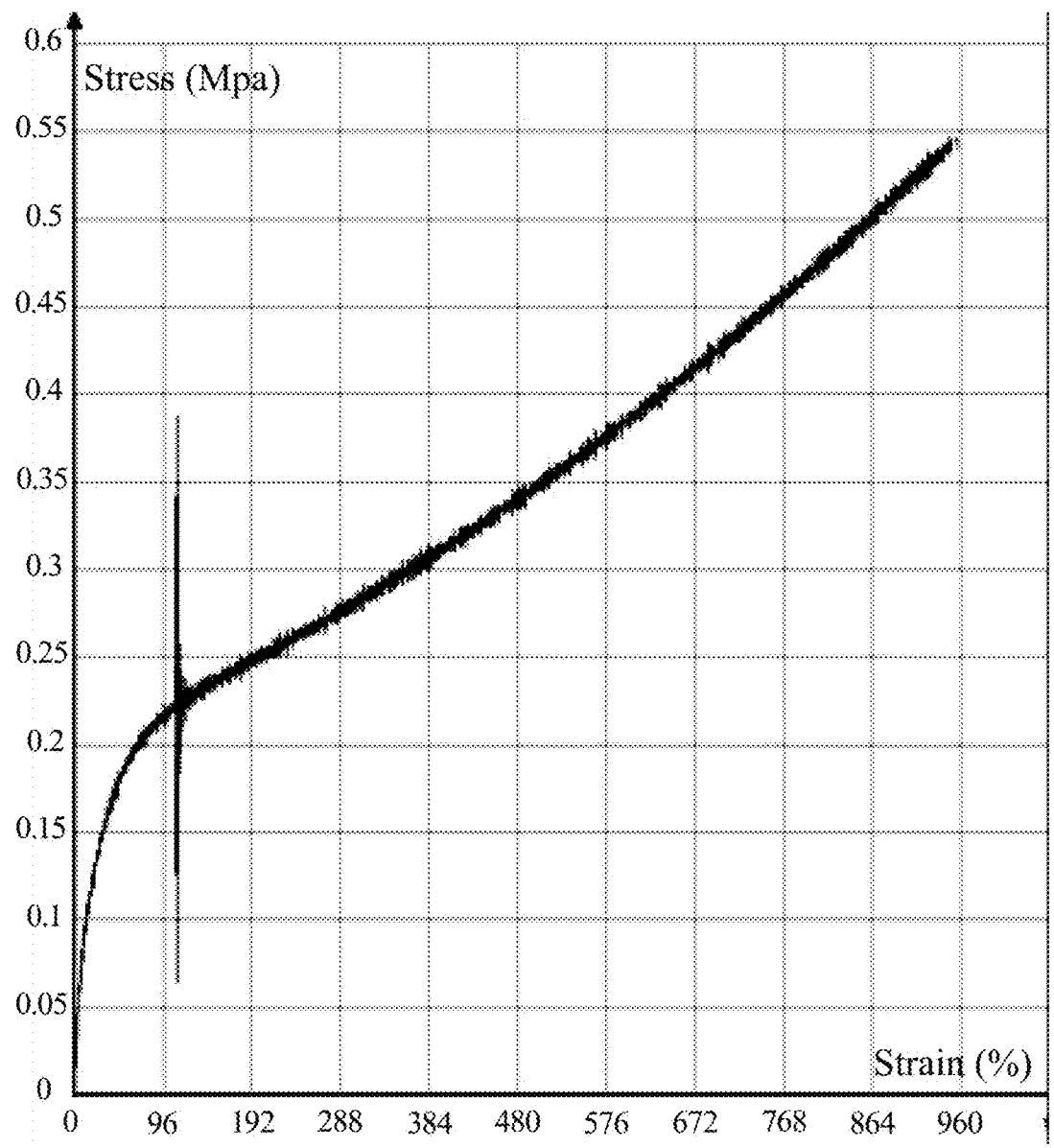
FIG. 10 is a stress-strain curve of the self-healing electrolyte membrane with the wide temperature range prepared in Example 3 after cutting off and self-healing.

FIGS. 8-10 showed the stress-strain curves of the self-healing electrolyte with the wide temperature range prepared in Example 3. The thickness of the test specimen was 0.37 mm. As shown in FIGS. 8-9, the stress (0.95 MPa) and the strain (1449%) of the self-healed electrolyte after scratch had little change when compared to those (0.86 MPa, 1386%) of the 0.86 MPa, 1386% at the initial state, indicating that the electrolyte had a high self-healing recovery rate. FIG. 10 was a stress-strain curve of the self-healed electrolyte after cutting. After self-healing, the stress of the electrolyte was 0.55 MPa and the strain of the electrolyte was 900%. It was shown that the recovery rate of the electrolyte was more than 60% even though it was cut off.

In summary, the cross-linked network structure with glycerin as a center of the self-healing electrolyte provided herein is formed by means of a polyhydroxyl structure of the glycerin. The polyether polyol capped with an isocyanate is connected to the glycerin and TDS, respectively. The cross-linked network, with the help of the self-healing effect of the TDS disulfide bond and the hydrogen bond, realizes a cross-scale (molecular, micro, and macro-scale) damage sensing response of the electrolyte and a rapid self-healing of the material, and further provides a multi-level (molecule-component-device-system) self-healing repair function, equipping the product with a high self-healing ability. In addition, the electrolyte has good mechanical and electrical properties, and can be used in other types of lithium ion secondary batteries such as NCM ternary lithium ion batteries and LFP lithium ion batteries.

The above embodiments are illustrative of the technical solutions, and are not intended to limit the scope of the present disclosure. For those skilled in the art, it should be noted that any modifications and replacements made without departing from the spirit of this disclosure should fall within the scope of the present disclosure defined by the appended claims.

What is claimed is:

1. A self-healing electrolyte with a wide temperature range, wherein the self-healing electrolyte comprises a glycerin segment, a diisocyanate segment and a segment containing at least two terminal hydroxyl groups and one disulfide bond; and the self-healing electrolyte has a three-dimensional cross-linked network structure.

2. The self-healing electrolyte of claim 1, wherein the diisocyanate segment is polyethylene glycol, polypropylene glycol or polybutylene glycol capped with an isocyanate.

3. The self-healing electrolyte of claim 2, wherein the diisocyanate segment is a polypropylene glycol segment with both ends capped with 2,4-toluene diisocyanate; and a number-average molecular weight of the diisocyanate segment is 700-3000 Da.

4. The self-healing electrolyte of claim 1, wherein the segment containing at least two terminal hydroxyl groups and one disulfide bond is obtained through reaction of N-ethylethanolamine and carbon disulfide.

5. A method for preparing the self-healing electrolyte of claim 1, comprising:
   S1. reacting N-ethylethanolamine with carbon disulfide to obtained a product marked as TDS;
   S2. reacting diisocyanate with a polyether polyol capped with a hydroxyl group to obtain a polyether polyol capped with isocyanate; and
   S3. mixing glycerin, the TDS obtained in step (S1) and the polyether polyol capped with the isocyanate obtained in step (S2) followed by reaction to obtain the self-healing electrolyte with the wide temperature range.

6. The method of claim 5, wherein in step (S1), the reaction is performed in a chloroform solution containing iodine under an ice bath.

7. The method of claim 5, wherein in step (S2), the diisocyanate is selected from the group consisting of toluene diisocyanate, isophorone diisocyanate, diphenylmethane diisocyanate, dicyclohexylmethane diisocyanate, hexamethylene diisocyanate, lysine diisocyanate and a combination thereof; and the polyether polyol is selected from the group consisting of polyethylene glycol, polypropylene glycol, polybutylene glycol and a combination thereof.

8. The method of claim 5, wherein the step (S3) comprises:
dissolving the glycerin in an organic solvent; adding a catalyst, the polyether polyol capped with the isocyanate obtained in step (S2) and the TDS obtained in step (S1) in sequence followed by reaction at 55-65° C. for 3-6 h; and removing the organic solvent to obtain the self-healing electrolyte with the wide temperature range.

9. A lithium ion battery, comprising a self-healing electrolyte prepared by the method of claim 5.

10. The lithium ion battery of claim 9, wherein an electrolyte of the lithium ion battery is prepared by making the self-healing electrolyte into a film or soaking a non-woven fabric with the self-healing electrolyte to form a composite electrolyte membrane.

11. A lithium ion battery, comprising the self-healing electrolyte of claim 1.

12. The lithium ion battery of claim 11, wherein an electrolyte of the lithium ion battery is prepared by making the self-healing electrolyte into a film or soaking a non-woven fabric with the self-healing electrolyte to form a composite electrolyte membrane.

* * * * *